(12) United States Patent
Tallet-Pinet et al.

(10) Patent No.: US 12,135,293 B2
(45) Date of Patent: Nov. 5, 2024

(54) METHOD FOR CHECKING COMPLIANCE OF A MECHANICAL PART OF A VEHICLE

(71) Applicant: JTEKT EUROPE, Irigny (FR)

(72) Inventors: Sarah Tallet-Pinet, Oullins (FR); Emeric Richard-Vitton, Lyons (FR)

(73) Assignee: JTEKT EUROPE, Irigny (FR)

( * ) Notice: Subject to any disclaimer, the term of this patent is extended or adjusted under 35 U.S.C. 154(b) by 367 days.

(21) Appl. No.: 17/601,798

(22) PCT Filed: Apr. 9, 2020

(86) PCT No.: PCT/FR2020/000102
§ 371 (c)(1),
(2) Date: Oct. 6, 2021

(87) PCT Pub. No.: WO2020/212654
PCT Pub. Date: Oct. 22, 2020

(65) Prior Publication Data
US 2022/0178840 A1 Jun. 9, 2022

(30) Foreign Application Priority Data
Apr. 15, 2019 (FR) ....................................... 1903978

(51) Int. Cl.
*G01N 21/00* (2006.01)
*G01N 21/88* (2006.01)
(Continued)

(52) U.S. Cl.
CPC ....... *G01N 21/8851* (2013.01); *G06T 7/0004* (2013.01); *G01N 2021/845* (2013.01);
(Continued)

(58) Field of Classification Search
CPC ......... G01N 21/8851; G01N 2021/845; G01N 2021/8887; G01N 21/9515;
(Continued)

(56) References Cited

U.S. PATENT DOCUMENTS

| 2007/0064989 A1* | 3/2007 | Chhibber | A61B 5/444 |
| | | | 382/128 |
| 2011/0052082 A1* | 3/2011 | Parkov | G07D 7/202 |
| | | | 382/209 |

(Continued)

FOREIGN PATENT DOCUMENTS

| CN | 205193012 U | * | 4/2016 | |
| EP | 1096249 A2 | * | 5/2001 | ............. G01N 21/91 |

(Continued)

OTHER PUBLICATIONS

Aug. 18, 2020 International Search Report issued in International Patent Application No. PCT/FR2020/000102.

*Primary Examiner* — Ping Y Hsieh
(74) *Attorney, Agent, or Firm* — Oliff PLC

(57) ABSTRACT

A method for checking compliance of a mechanical part of a vehicle, including an image capture step for producing a study image of the mechanical part, and a step of analyzing the study image by an analysis unit, the analysis step including a results phase transmitting a results signal indicating whether the mechanical part is compliant or non-compliant.

8 Claims, 4 Drawing Sheets

(51) Int. Cl.
  *G06T 7/00*   (2017.01)
  *G01N 21/84*  (2006.01)
(52) U.S. Cl.
  CPC ............... *G01N 2021/8887* (2013.01); *G06T 2207/10152* (2013.01); *G06T 2207/30164* (2013.01)
(58) Field of Classification Search
  CPC ............. G01N 2021/887; G01N 21/91; G06T 7/0004; G06T 2207/10152; G06T 2207/30164; G06T 7/0006; G06T 7/90; G06T 2207/20224
  See application file for complete search history.

(56) References Cited

U.S. PATENT DOCUMENTS

2015/0192526 A1* 7/2015 Nissen ............... G01N 21/9515
                                              382/141
2020/0166467 A1* 5/2020 Bian .................... G01N 21/643

FOREIGN PATENT DOCUMENTS

| EP | 2891878 A1    | 7/2015  |
| JP | S63-82358 A   | 4/1988  |
| JP | 2001-194316 A | 7/2001  |
| JP | 2002-324233 A | 11/2002 |
| JP | 2015-225042 A | 12/2015 |
| JP | 2017-40612 A  | 2/2017  |
| WO | 2017/221024 A1| 12/2017 |

\* cited by examiner

METHOD FOR CHECKING COMPLIANCE OF A MECHANICAL PART OF A VEHICLE

The invention concerns the field of compliance checks carried out on a mechanical part of a vehicle and more particularly a method for automatically detecting defects.

Some mechanical parts are involved in the safety of the occupants of the vehicle. Thus, a manufacturer of such parts must ensure their compliance by means of a compliance check of the compliance according to predefined specifications.

The compliance check makes it possible in particular to identify, localize and guarantee the absence of any surface or underlying metallurgical defect resulting, for example, from a problem in the production of the material or from a surface treatment (at intergranular level) of the mechanical part.

Subsequently, as example, and in a non-limiting manner, a compliance check carried out on a particular mechanical part: a rack of a steering system. However, the compliance check could be applied to other mechanical parts such as a drive pinion, a connecting rod, a camshaft, or a steering knuckle for example.

A rack is a mechanical part making possible to steer the wheels, that is to say making it possible to change an angle of orientation of the wheels, via tie rods. The rack is generally between 400 mm and 900 mm. It is made of a ferromagnetic material. It comprises a body having a generally cylindrical shape with a diameter generally comprised between 22 mm and 34 mm and a toothing.

The toothing includes a plurality of teeth which extend along an axis transverse to an axis of elongation of the rack. Each tooth is separated from the adjacent tooth by a tooth gullet. Each tooth comprises a right tooth flank and a left tooth flank connected by a tooth crest.

During the manufacture of the rack, defects might be created. More specifically, the body might have at least one "rod line". It consists of a linear defect extending along the axis of elongation of the rack. In addition, the toothing may have defects, hereinafter referred to as "cracks", the dimensions of which are generally at least 1 mm long and at least 5 µm wide. Thus, it is necessary to carry out a compliance check, that is to say a check for the absence of defects, of each rack.

Currently, the compliance check of a rack includes the following steps:
  Magnetization of the rack by means of a magnetization device making it possible to diffuse a current in the rack;
  Spraying of the rack with a developer product by means of a spraying device, the developer product becoming fluorescent under ultraviolet light;
  Checking of the rack by an operator;
  Demagnetization.
  This compliance check can of course be adapted to a different mechanical part other than the rack.

The step of checking the rack by the operator requires, on the one hand, the presence of the operator in a room illuminated by UV light and, on the other hand, that the operator grasps the rack to be checked so as to be able to observe the body and the toothing in order to detect any defect.

The drawback is that this method is subject to human error. Thus, a defect might be not detected by the operator.

The invention aims at overcoming all or part of the aforementioned drawbacks by proposing a method for checking compliance of a mechanical part of a vehicle comprising an image capture step intended to produce a study image of the mechanical part, and a step of analyzing the study image by an analysis unit, and a result phase emitting a result signal indicating whether the mechanical part is compliant or, on the contrary, non-compliant.

During the image capture step, an image capture apparatus produces at least one study image of the mechanical part. Said study image is a digital image of dimension n*m pixels, with n≥1 and m>1. A pixel is the smallest constituent element of the image. The pixel is defined by its value, representing its brightness, and its color.

It is defined that a set of pixels is composed of at least two pixels where at least one side of a first pixel is juxtaposed to one side of a second pixel, the first pixel and the second pixel having a value and/or a color comprised within a determined range. A set of pixels is a characteristic representation of the study image corresponding to an element of the mechanical part such as a defect, a tooth crest, a tooth flank, etc. In other words, a characteristic representation is a shape or a surface of the study image specific to a representation of an element of the mechanical part on the study image. The characteristic representation of a same element varies, for example, according to the lighting conditions in which the study image is produced, a viewing angle, or a surface condition of the mechanical part.

The analysis step receives as input the study image representing the mechanical part or at least one portion of the mechanical part. When the mechanical part is a rack, the study image represents at least partially the body or the toothing of the rack.

The analysis step makes it possible to detect the presence or absence of a defect on the mechanical part.

According to a feature of the invention, the analysis step comprises a phase of comparing a value of at least one property of a set of pixels of the study image to a reference value of the at least one property corresponding to at least one detection criterion.

The comparison phase determines, from the study image, the presence or absence of a defect on the mechanical part. More specifically, the comparison phase compares a value of at least one property of a set of pixels of the study image to a reference value of the at least one property corresponding to a detection criterion, and determines as a function of the at least one detection criterion, whether the study image has a set of pixels, that is to say a characteristic representation, revealing the presence of a defect on the mechanical part.

The comparison phase is iterative so as to compare all sets of pixels of the study image.

The at least one detection criterion is a measurable magnitude of the set of pixels, that is to say a reference value of a property of the set of pixels. The detection criterion is selected judiciously, by an operator or a machine, so as to allow detection in the study image of a set of pixels representing a defect, that is to say a set of pixels of which a property validates the detection criterion.

In order to facilitate the choice of the detection criterion, the study image of the mechanical part is produced according to defined, reproducible parameters. The parameters are quantities external to the image capture apparatus and to the checking method.

In this way, it is possible to produce, during the image capture step, a plurality of images of one or a plurality of mechanical parts according to the defined parameters. It is then possible to check the presence or absence of a defect on the plurality of images, and thus determine the compliance of the single or of the plurality of mechanical parts with at least one detection criterion identical to all of the study images.

The method for checking the compliance of a rack according to the invention based on a study image, and on objective detection criteria. The search for a defect on the mechanical part is therefore no longer determined subjectively by an operator.

The object of the checking method is to sort out the mechanical parts having a defect, from the mechanical parts having no defect. Thus, the analysis step comprises a result phase. The result phase indicates, by sending a result signal, whether the mechanical part has a defect or not.

More specifically, if the comparison phase detects a set of pixels whose property validates the at least one detection criterion, the mechanical part has a defect. Conversely, if the comparison phase does not detect any set of pixels validating the at least one detection criterion, the mechanical part does not contain any defect, the mechanical part is compliant.

The result signal may consist of an audible or visual signal.

The result signal is transmitted to an operator or to a sorting machine which sorts the racks.

The result signal is a compliance signal or a defect signal.

According to a feature of the invention, the image capture step is performed automatically.

Thus the parameters in which the study image is produced are objectively checked by a machine.

According to a feature of the invention, the analysis step is performed automatically, that is to say without the intervention of a human being, by an analysis unit comprising at least one processor.

Thus, the detection of a defect on the mechanical part is not subject to human error. The detection of a defect is objective.

According to a feature of the invention, the comparison phase compares a value of a plurality of properties of a set of pixels of the study image to a reference value of a plurality of properties corresponding to a plurality of detection criteria According to a feature of the invention, the method and in particular the comparison phase is iterative.

According to a feature of the invention, the analysis step comprises a definition phase during which at least one detection criterion is defined.

The definition phase enables the operator or the machine to modify the at least one detection criterion, that is to say a reference value of at least one property, as a function of the parameters in which the image has been produced.

According to a feature of the invention, the detection criterion is determined by a machine learning process also called "machine learning" or "deep learning".

According to a feature of the invention, the mechanical part is a part of a steering system of a vehicle.

According to a feature of the invention, the mechanical part is a rack.

According to a feature of the invention, the at least one detection criterion is defined from: a width of a set of pixels having a value and/or a given color, a height of a set of pixels having a value and/or a given color.

Thus, according to the parameters in which the study image was produced, the operator or the machine can modify the detection criterion.

According to a feature of the invention, the image capture step comprises a raw image phase during which at least one image capture apparatus produces at least one raw image of the mechanical part.

A raw image of the mechanical part depends on the parameters in which the study image is produced and on a setting of the image capture apparatus.

According to a feature of the invention, the image capture apparatus produces at least one raw black and white image.

A raw black and white image comprises a matrix of pixels, said pixels being defined only by their value. Black has a value of 0. White has a value of 255. A pixel with a value between 0 and 255 has a more or less dark gray tint.

A black and white image reduces the number of detection criteria that can be selected since the pixels of the image have no color.

According to a feature of the invention, during the raw image phase, the image capture apparatus produces a first image during which the mechanical part is illuminated by white light.

White light is polychromatic light including a plurality of electromagnetic radiations of the visible spectrum, i.e. approximately a wavelength of between 400 nm and 800 nm, or including radiations of the same intensity corresponding to the primary colors of the additive synthesis, namely red, green and blue.

The first image makes it possible to determine areas present in the image but does not make it possible to reliably detect a representation characteristic of a defect. These are the shiny areas.

In the first image, the shiny areas appear white while the rest of the mechanical part is light gray.

The first image is used to create, during the analysis step, a geometric mask of the areas of the image that should not be subjected to the automatic analysis.

According to a feature of the invention, during the raw image phase, the image capture apparatus produces a second image during which the mechanical part is illuminated by an ultraviolet light.

Ultraviolet light is light comprising radiations with wavelengths less than approximately 400 nm.

In order to detect the defects present on a mechanical part, it is known to spray said mechanical part with a developer product which becomes fluorescent under ultraviolet light.

The second image makes it possible to highlight the possible presence of a defect which will shine under ultraviolet light. Thus, on the second image, the defects appear white whereas the rest of the mechanical part is dark gray.

According to a feature of the invention, the first image has a dimension identical to the second image.

According to a feature of the invention, the position of the mechanical part is identical in the first image and the second image.

According to a feature of the invention, the image capture step comprises an image processing phase of the at least one raw image so as to obtain the study image.

The image processing phase performs a modification of the value or/and of the color of at least one pixel of the processed raw image.

The processing phase can also combine a plurality of raw images so as to obtain a new image.

The processing phase can finally combine a plurality of images so as to create a new image. For example, if the image capture apparatus is a linear image capture apparatus, the raw image is a linear image of dimension close to 1*n pixels, with n≥1. A linear image has a homogeneous brightness. Thus, the processing phase can combine the linear images so as to obtain a new image featuring a developed view of the mechanical part.

The processing phase can change a contrast or the brightness of the raw image, improve sharpness, or change colors.

In this way, it is possible to obtain a study image on which a defect could be detected.

According to a feature of the invention, during the image processing phase, the second image is subtracted from the first image so as to obtain the study image. The study image is a new image created from the first image and the second image.

The operation of subtracting the two images consists in subtracting from each pixel value of the first image, the pixel value of the second image from the corresponding pixel, so as to obtain the value of the corresponding pixel of the study image.

The subtraction operation can be illustrated by the formula below:

$$P_{xy}^3 = P_{xy}^1 - P_{xy}^2 \quad \text{[Math 1]}$$

With $P_{xy}^3$: the value of the pixel with coordinates (x, y) of the study image, $P_{xy}^1$: the value of the pixel with coordinates (x, y) of the first image, $P_{xy}^2$: the value of the pixel coordinates (x, y) of the second image.

The subtraction operation makes it possible to increase the contrast of the defects present in the second image.

The defects being white on the second image, the pixels $P_{xy}^2$ representing the defects have a high value, close to 255.

The pixels $P_{xy}^1$ analyzed on the first image are generally gray, therefore a value less than 255, for example close to 0.

Thus during the subtraction operation, the value of the pixels representing a defect in the study image is close to −255. Any negative value is assimilated to the value 0. Therefore the pixels representing a defect on the study image are black.

The rest of the mechanical part appears in light gray on the first image and dark gray on the second image, so the value of the pixels of the first image is greater than the value of the pixels of the second image. Thus the value of the pixels of the study image is high, that is to say the mechanical part appears on the study image in light gray.

In this way, on the study image, the contrast of the defects is increased to the detriment of the mechanical part, i.e. the contrast of the geometric variations of the mechanical part is reduced.

The comparison phase uses an image that has undergone a treatment so as to increase the contrast of the defects.

The at least one detection criterion is thus easier to determine.

According to a feature of the invention, the subtraction operation may be followed by a step during which the number and/or location of each identified defect is deduced.

The invention will be better understood, thanks to the description hereinafter, which relates to an embodiment according to the present invention, given as non-limiting example and explained with reference to the appended schematic drawings, in which.

Figure 1:
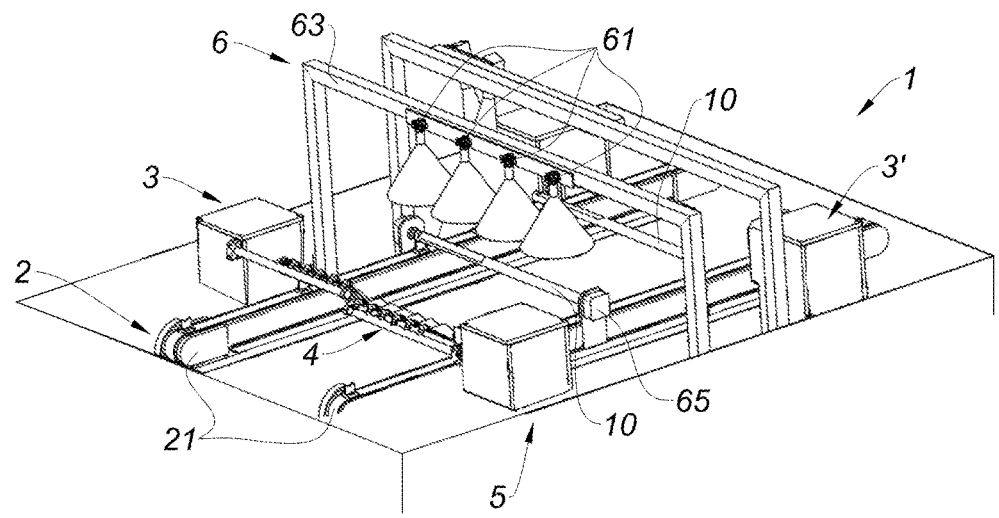
FIG. 1 is a view at a first angle of an installation making it possible to perform a checking method according to the invention.
Figure 2:
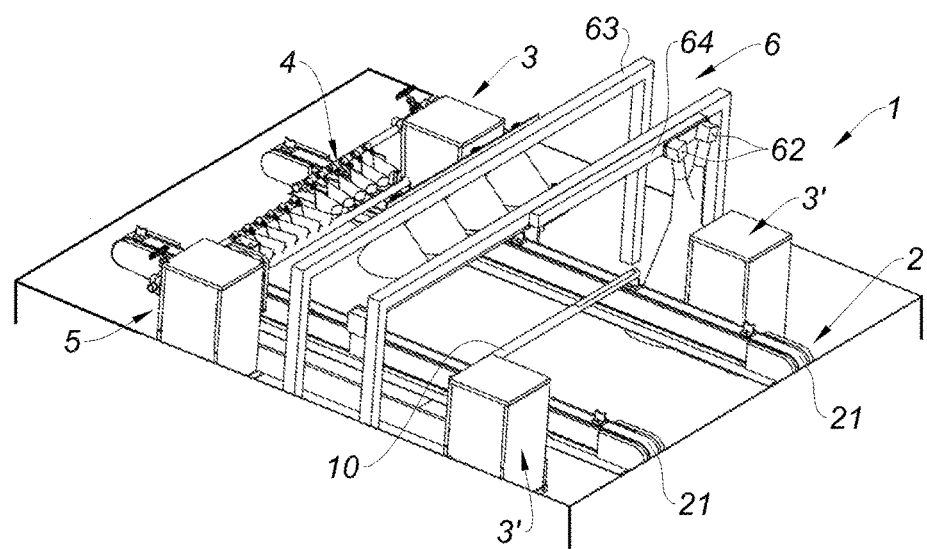
FIG. 2 is a view at a second angle of the installation of FIG. 1.

FIGS. 1 and 2 illustrate an installation 1 making it possible to perform a checking method 100 according to the invention. The installation 1 comprises a conveyor 2 provided with two conveyor belts 21. Said conveyor 2 comprises "V" shaped supports intended to receive a rack 10 for a steering system of a vehicle. The rack 10 is intended to be positioned transversely on the conveyor belts 21. A conveyor belt 21 is movable relative to the other. Thus, a spacing between the two conveyor belts 21 is adjusted as a function of a length of said rack 10.

The installation 1 comprises a magnetization device 3. The magnetization device 3 diffuses a current in the rack 10 so as to make it magnetic.

The installation 1 comprises a device 4 for spraying a developer product. The developer product is a product that fluoresces under ultraviolet light. The developer product comprises an aqueous base.

The installation 1 comprises a device 5 for drying the developer product. The drying device 5 induces a current in the rack 10 so as to increase its temperature and thus dry the developer product.

Figure 3:
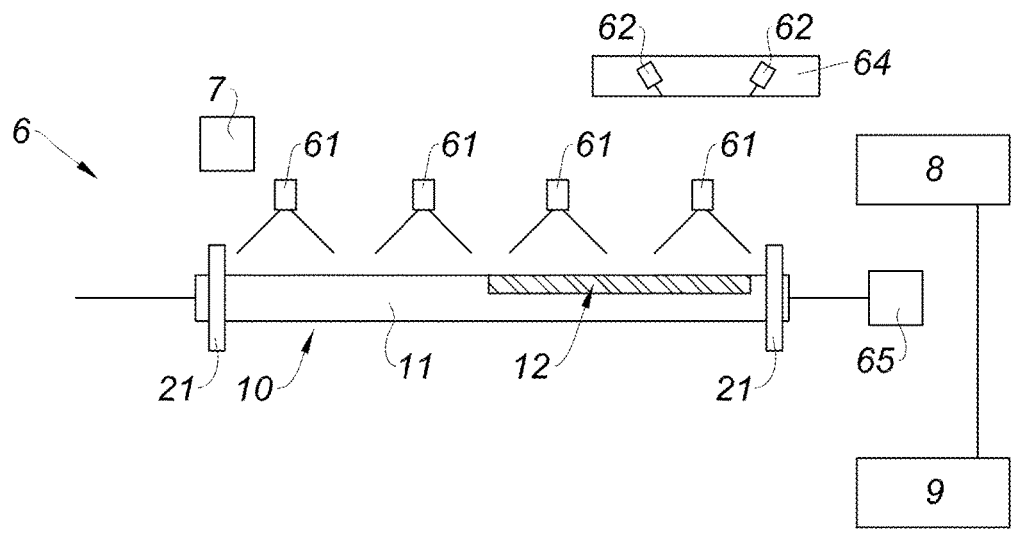
FIG. 3 is a schematic representation of a device for generating at least one raw image.

The installation 1 also comprises a device for generating at least one image 6. FIG. 3 is a schematic representation of the device for generating at least one image 6.

Said device for generating at least one image 6 comprises 4 first image capture apparatuses 61 positioned parallel to the axis of elongation of the rack 10. The first image capture apparatuses 61 consist of cameras. The first image capture apparatuses 61 are fixed relative to the installation 1, more specifically, they are fixed on a support 63 extending along the axis of elongation of the rack 10. The first image capture apparatuses 61 are so-called linear image capture apparatuses. Each of the first image capture apparatuses 61 produces a raw linear image of 40°, configurable from 20° to 120°. The first image capture apparatuses 61 produce raw black and white images. The first image capture apparatuses 61 operate under white light or under ultraviolet light emitted by an ultraviolet lamp 7.

Said device for generating at least one image 6 also comprises 2 second image capture apparatuses 62 positioned so as to form an angle of less than 90° with the axis of elongation of the rack 10. The second 2 image capture apparatuses 62 consist of cameras. The second 2 image capture apparatuses 62 are positioned symmetrically with respect to the axis transverse to the axis of elongation of the rack 10. The second image capture apparatuses 62 are fixed to a moving system of the second 2 image capture apparatuses 62, and more specifically on a translating system 64 of the second 2 image capture apparatuses 62 along the axis of elongation of the rack 10. The second image capture apparatuses 62 are so-called matrix image capture apparatuses. The second image capture apparatuses 62 produce matrix raw black and white images. The second image capture apparatuses 62 operate under white light or under ultraviolet light emitted by the ultraviolet lamp 7.

Said device for generating at least one image 6 further comprises a system for moving the rack 10. The system for moving the rack 10 comprises a system 65 for rotating the rack 10 about the axis of elongation of the rack 10. To rotate the rack 10 about its axis of elongation, the rotation system 65 comprises an axis element coming into contact with one end of the rack 10.

Said device for generating at least one image 6 also comprises a device 8 for transmitting the at least one image to an analysis unit 9.

The analysis unit 9 is a processor connected to a screen, Preferably, the analysis unit 9 is positioned at a distance from the device for generating at least one image 6.

The installation 1 also comprises a device 3' for demagnetizing the rack 10 making it possible to demagnetize said rack.

Figure 4:
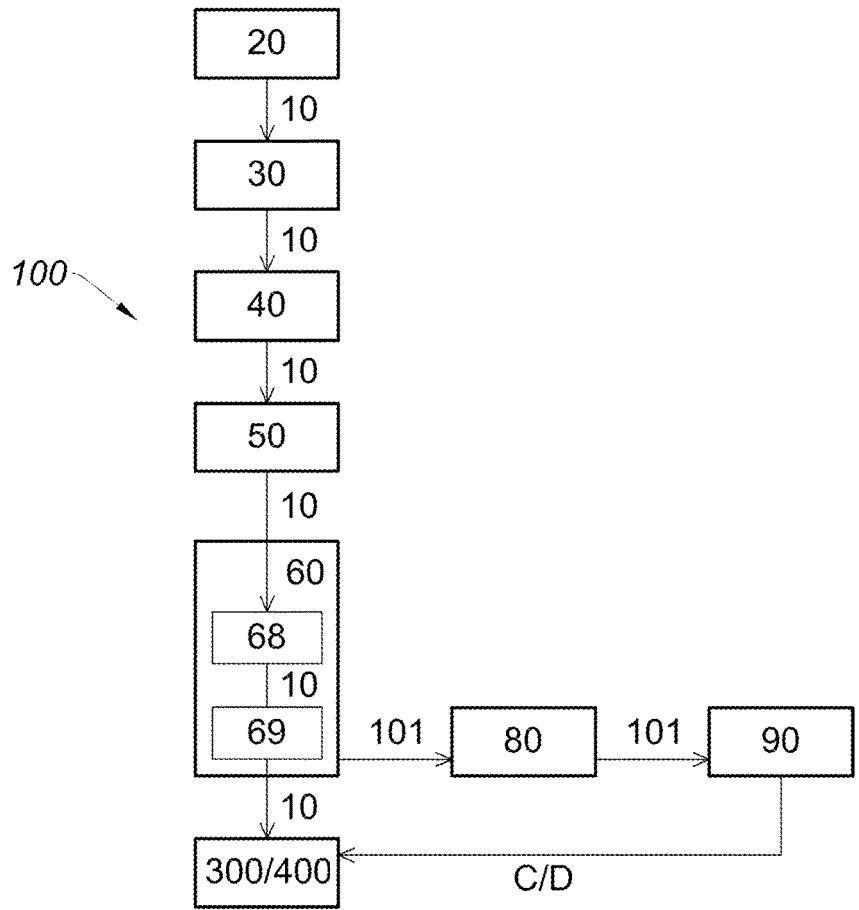
FIG. 4 is a flowchart of a checking method according to the invention.

FIG. 4 is a flowchart of the checking method 100 according to the invention.

The method 100 for checking the compliance of the rack 10 implements the installation 1 described above.

The checking method 100 comprises a step of depositing 20 the rack 10 on the conveyor 2. The depositing step 20 is performed by an operator or by a machine. The operator or the machine positions each end of the rack 10 on the supports of the conveyor belts 21.

The conveyor 2 brings the rack 10 to the magnetization device 3 which carries out a step 30 of magnetizing the rack 10.

The rack 10 is then sprayed by means of the spraying device 4 with the developer product during a spraying step 40.

The drying device 5 induces a current in the rack 10 so as to increase its temperature and thus dry the developer product during a drying step 50. Thus the developer product is dry during the image capture step 60 and creates little shiny area.

The conveyor 2 brings the rack 10 to the device for generating at least one image 6 which performs an image capture step 60 of the rack 10. The image capture step 60 generates a study image 101 of the rack 10.

More specifically, the image capture step 60 comprises a raw image phase 68.

The raw image phase 68 comprises a rod image capture phase under white light so as to generate a first rod image, then under ultraviolet light so as to generate a second rod image. During the rod image capture phase, the rotating device 65 of the rack 10 performs a step-by-step rotation of a predetermined angle of the rack 10 and each of the first image capture apparatuses 61 produces a first image and a second rod image at each rotation step.

In other words, at the first step "n", each of the first image capture apparatuses 61 produces a raw image under white light then under ultraviolet light of a portion of line "m" of the rack 10. An area, extending over the entire length of rack 10, of the surface of rack 10 facing the first image capture apparatuses 61, is called the line of the rack 10.

At the next step "n+1", the rack is pivoted about its axis of elongation with a predetermined angle. The line "m+1" then faces the first image capture apparatuses 61. Each of the first image capture apparatuses 61 produces a raw image under white light then under ultraviolet light of a portion of line "m+1" of the rack 10.

Once the rack has performed a complete rotation about its axis of elongation, that is to say when the line "m" is again opposite the first image capture apparatuses 61, a raw image of the set of the rack lines has been produced under white light and ultraviolet light.

The raw image phase 68 then comprises a toothing image capture phase under white light so as to generate a first toothing image, then under ultraviolet light so as to generate a second toothing image. During the toothing image capture phase, each of the second 2 image capture apparatuses 62 produces raw images under white light and then under ultraviolet light of the toothing 12 of the rack 10.

More specifically, one of the second image capture apparatuses 62 is oriented so as to be able to take a raw image of a right tooth flank 70 of at least one tooth 71 of the toothing 12 whereas the other image capture apparatus 62 is oriented so as to be able to take an image of a left tooth flank of the at least one tooth 71. A depth of field of the second image capture devices 62 make it possible to take 3 tooth flanks on the same raw image.

Thus, the rack 10 is oriented so as to place the toothing facing the second image capture apparatuses 62. The second image capture apparatuses 62 take a raw image, under white light and then under ultraviolet light, of the right and left teeth flanks 70 of the first three teeth "d". Then the second image capture apparatuses 62 are translated by means of the translating system 64 by a predetermined distance. The predetermined distance depends on the depth of field of the second image capture apparatuses 62. The second image capture apparatuses 62 take a raw image, under white light and then under ultraviolet light, of the right 70 and left tooth flanks of the next three teeth "d+1". In this way, a raw image of the right 70 and left tooth flanks of all teeth 71 of the set of teeth 12 is produced.

The image capture step 60 comprises an image processing phase 69. The image processing phase 69 assembles the raw rod images taken under white light of the 4 line portions "m" so as to form an image of the line "m" of the rack 10. Then the processing phase 69 assembles the 4 portions of the line "m+1" taken under white light so as to form an image of the line "m+1" of the rack 10. Finally, the processing phase 69 assembles the image taken under white light of the line "m" with the image taken under white light of the line "m+1" so as to produce a first rod image corresponding to a developed view of the body of the rack 10 taken under white light.

Likewise, the processing phase 69 produces a second rod image corresponding to a developed view of the body of the rack 10 taken under ultraviolet light.

Figure 5:
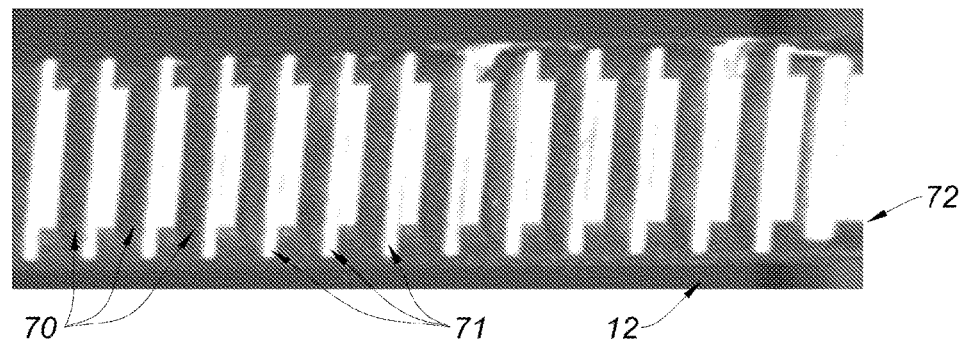
FIG. 5 is a first image of a toothing of a rack taken during an image capture step according to the invention.

The processing phase 69 assembles the raw images taken under white light of the right tooth flanks 70 of the rack so as to obtain a first image of toothing 72 corresponding to a developed view of the right tooth flanks 70 of the toothing 12. The first image of toothing 72 is illustrated in FIG. 5. The toothing 12 has a light gray color whereas the crest of the teeth 71 and the gullet of teeth 71 are white because the crest of the teeth 71 and the gullet of teeth 71 are shiny areas under white light.

Figure 6:
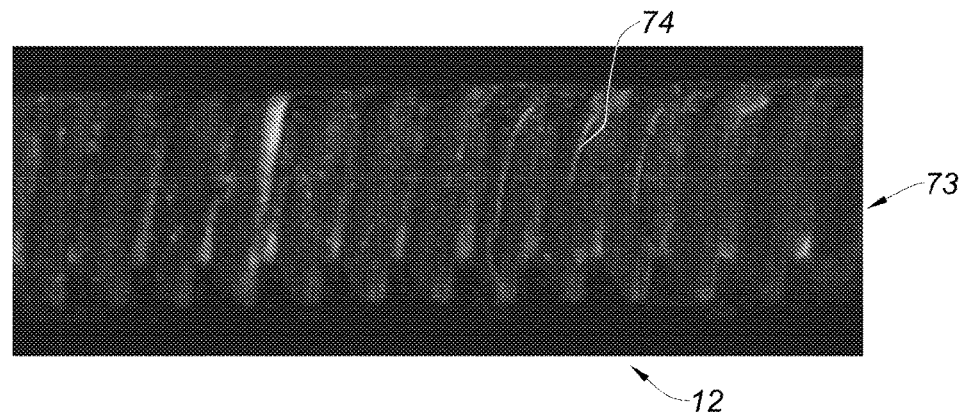
FIG. 6 is a second image of the toothing of the rack of FIG. 5.

In the same way, the processing phase 69 assembles the raw images taken under ultraviolet light of the right tooth flanks 70 of the rack so as to obtain a second toothing image 73 corresponding to a developed view of the right tooth flanks 70. The second toothing image 73 is illustrated in FIG. 6. The toothing 12 is dark gray whereas defects 74 are white. Indeed, on said image produced under ultraviolet light, the developer product which has been introduced into the cracks 74 appears fluorescent and therefore shiny.

Of course, the processing phase 69 carries out an identical processing of the raw images taken under white light of the left tooth flanks of the rack.

Figure 7:
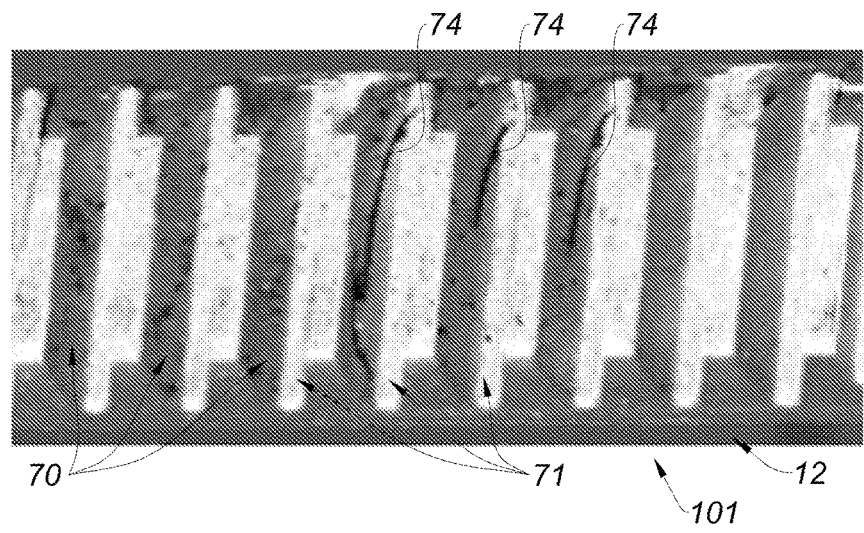
FIG. 7 is a study image according to the invention.

The processing phase 69 then carries out a subtraction of the second toothing image 73 from the first toothing image 72 so as to create the study image 101. The study image 101 is represented in FIG. 7.

It can be seen that in the study image 101, the defects 74 appear in black and are clearly visible on the flanks of the right tooth 70 which appear in light gray.

The study image 101 taken by the device for generating at least one image 6 is transmitted during a step for transmitting 80 the study image by the transmission device 8 to the analysis unit 9.

The analysis unit 9 performs an analysis step 90 of the study image 101.

The analysis step 90 comprises a definition phase 92 during which at least one detection criterion X is defined, for example, 3 detection criteria may be defined. A detection criterion X corresponds to a reference value of a property of a set of pixels of the study image 101.

The analysis step 90 comprises a comparison phase 93 during which a first set of pixels of the study image 101 is detected. Then a value of a first property of said first set of pixels is compared to a reference value of said first property corresponding to a first detection criterion. Then, a value of a second property of said first set of pixels is compared to a reference value of said second property corresponding to a second detection criterion. The previous operation is repeated as many times as there are defined detection criteria.

The previous operation is then repeated with a second set of pixels and as many times as there are detected sets of pixels.

The comparison phase then transmits the results R of the comparisons carried out in the form of a result table to a result phase 94.

The result phase 94 determines whether at least one value of at least one property of a set of pixels of the study image 101 validates at least one detection criterion, then emits a result signal C, D indicating whether the rack 10 is compliant or, on the contrary, non-compliant.

Figure 8:
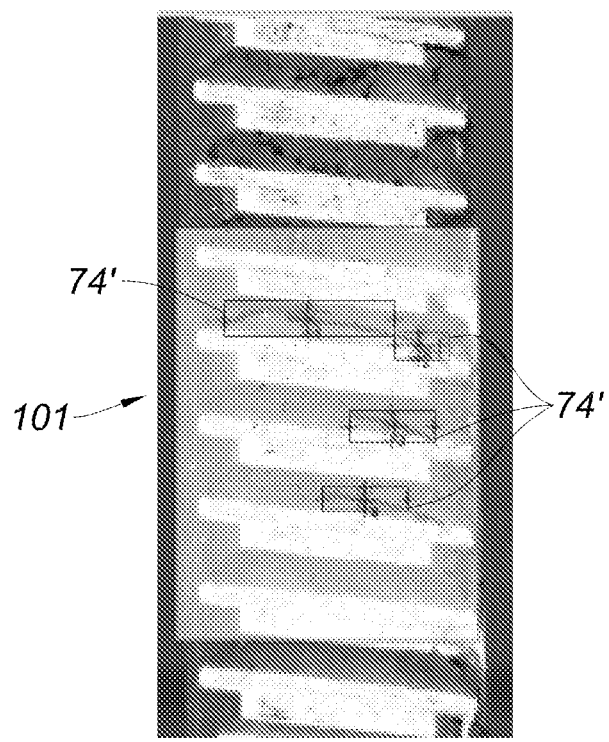
FIG. 8 is an image of the comparison phase according to the invention.
Figure 9:
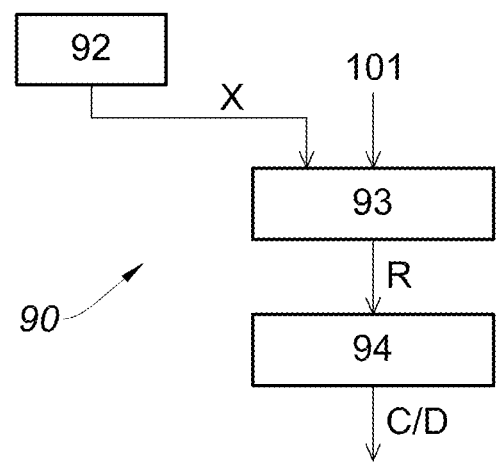
FIG. 9 is a flowchart of the analysis step.

The result phase 94 may also display the study image 101 on which the detected defects 74' appear, as represented in FIG. 8.

If the rack 10 does not have any rod line or crack type defects, the rack 10 is declared compliant. Then a compliance signal C is emitted by the analysis unit 9. If the rack 10 has rod line or crack type defects, the rack 10 is declared non-compliant. Then a defect signal D is emitted by the analysis unit 9.

On the compliance signal C, the conveyor 2 brings the rack 10 to the demagnetization device 3' which performs a step for demagnetizing 300 the rack 10.

On the defect signal D, the rack is evacuated by an operator or a machine which removes said rack from the conveyor 2 during an evacuation step 400. The rack does not undergo the demagnetization step 300.

In this way, the installation 1 allows a compliance check of the rack 10.

Of course, the invention is not limited to the embodiments described and represented in the appended figures. Modifications are still possible, in particular with regards to the constitution of the various elements or by substitution of technical equivalents, yet without departing from the scope of protection of the invention.

The invention claimed is:

1. A method for checking compliance of a rack of a vehicle comprising:
    a rack treatment step in which the rack is magnetically treated with a developer product, the developer product becoming fluorescent under ultraviolet light,
    an image capture step to produce a study image of the rack, the image capture step including:
        producing, by an image capture apparatus, a first image of the rack by illuminating the rack with only a white light,
        producing, by the image capture apparatus, a second image of the rack by illuminating the rack with only an ultraviolet light, and
        an image processing phase of processing the first image so as to obtain the study image, the second image being subtracted from the first image so as to obtain the study image, and
    a step of analyzing the study image by an analysis unit, said analysis step comprising a result phase emitting a result signal indicating whether the rack is compliant or non-compliant, wherein
    the image capture apparatus captures a plurality of linear images each having a dimension of n by 1 pixels, with n≥1, and a homogeneous brightness, and
    the image processing phase processes the linear images so as to obtain the first image.

2. The checking method according to claim 1, wherein the analysis step comprises a definition phase during which at least one detection criterion is defined for detecting whether the rack is compliant or non-compliant.

3. The checking method according to claim 2, wherein the at least one detection criterion is defined from: a width of a set of pixels having a value or a height of a set of pixels having a value.

4. The checking method according to claim 1, wherein the image capture step comprises a raw image phase during which at least one image capture apparatus produces at least one raw image of the rack.

5. The checking method according to claim 4, wherein, during the raw image phase, the image capture apparatus produces at least one raw black and white image.

6. The checking method according to claim 4, wherein, during the raw image phase, the image capture apparatus produces the first image during which the rack is illuminated by the white light.

7. The checking method according to claim 4, wherein, during the raw image phase, the image capture apparatus produces the second image during which the rack is illuminated by the ultraviolet light.

8. The checking method according to claim 1 comprising a step during which the number and/or the location of each identified defect of the rack is/are deduced.

* * * * *